Inventor:
MAX WEBER
By K. A. May
ATTORNEY

Inventor:
MAX WEBER
By K.A. ____
ATTORNEY

United States Patent Office 3,240,675
Patented Mar. 15, 1966

3,240,675
CONTROL SYSTEM FOR A STEAM GENERATOR RECEIVING HEAT FROM A NUCLEAR REACTOR
Max Weber, Wiesendangen, Zurich, Switzerland, assignor to Sulzer Brothers, Limited, Winterthur, Switzerland, a corporation of Switzerland
Filed Sept. 5, 1963, Ser. No. 306,937
Claims priority, application Switzerland, Sept. 12, 1962, 10,786/62
6 Claims. (Cl. 176—20)

The present invention relates to a system for regulating the supply of a liquid operating medium to a vapor generator having a superheater and forming part of a nuclear reactor plant wherein a heat carrier fluid circulates through the reactor for cooling it and through the vapor generator for heating the vapor generator. The temperature of the heat carrier fluid entering the vapor generator is maintained substantially constant and the heat carrier fluid flows substantially in counterflow relation with respect to the flow of the operating medium through the vapor generator.

It is known to use the coolant of a nuclear reactor as a heat carrier for evaporating a liquid operating medium in a vapor generator. This operating medium usually is water. The generated vapor may be used, for example, for producing power in a turbine. It is also known to maintain constant the outlet temperature of the operating medium of the vapor generator by suitable control of the rate at which the liquid operating medium is fed into the vapor generator. It is conventional to provide for this purpose a temperature sensing device at the outlet of the superheater of the vapor generator which device produces a control signal. The rate of supply of liquid operating medium to the vapor generator is controlled by means of a valve which is actuated in response to said signal. For economical reasons a small temperature drop between the heat carrier fluid and the operating medium of the vapor generator is preferred. The vapor generator is preferably so constructed and arranged that there is little difference between the temeprature of the vapor or steam leaving the vapor generator end of the heat carrier entering the steam generator. This arrangement has the disadvantage that a change of the rate of feeding liquid operating medium into the vapor generator has only little effect on the outlet temperature of the operating medium. Adjustment of the rate of feedwater supply in response to the outlet temperature of the operating medium of the steam generator is therefore inaccurate.

It is an object of the present invention to provide a method of and means for controlling the operation of a steam or vapor generator which is heated by the coolant of a nuclear reactor plant, whereby the outlet temperature of the operating medium of the vapor generator is accurately maintained. This object is achieved by regulating the rate of feedwater supply to the generator in response to the temperature of an intermediate portion of the superheater forming part of the steam generator.

A plant according to the invention includes a temperature sensing device producing a control signal which is used for controlling the actuation of means for regulating the rate of supply of liquid operating medium or of feedwater to a vapor or steam generator, the aforesaid temperature sensing device being connected to an intermediate portion of the superheater of the vapor or steam generator.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Figure 1:
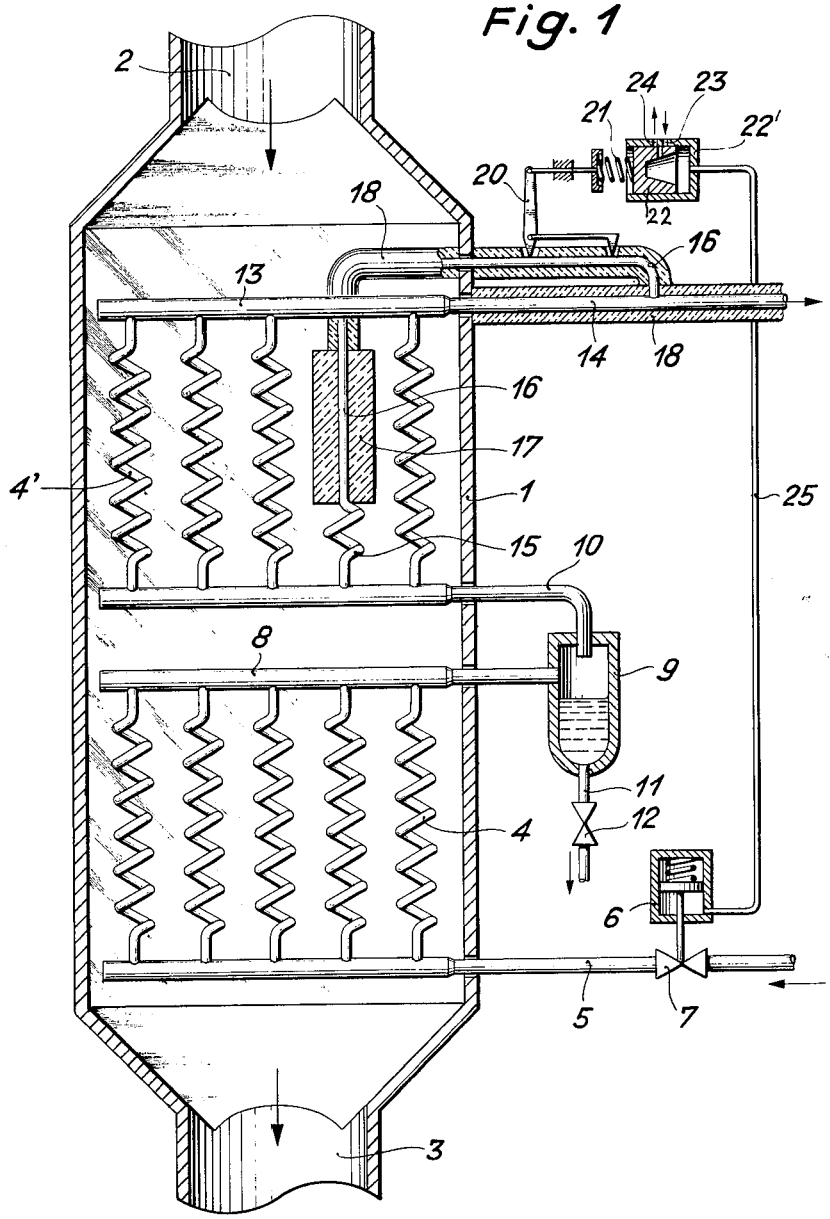
FIG. 1 is a diagrammatic sectional elevation of a vapor generator controlled according to the invention.

Referring more particularly to FIG. 1 of the drawing, numeral 1 designates a vessel through which passes the heated coolant coming from a nuclear reactor, not shown. The coolant or heat carrier fluid is circulated in the conventional manner by means of a circulating pump through the nuclear reactor and through the steam generator. The temperature of the heat carrier entering the vessel 1 through an inlet 2 is maintained substantially constant or at least between predetermined limits by means of conventional control devices. The cooled heat carrier leaves the vessel 1 through an outlet 3. Tube coils 4 are arranged in the vessel 1 for evaporating a liquid operating medium and tube coils 4' are placed in the vessel 1 for superheating the evaporated operating medium. Liquid operating medium is supplied to the evaporating coils 4 through a pipe 5 in which a feed valve 7 actuated by a hydraulic servometer 6 is inserted. The operating medium leaving the coils 4 is conducted through a pipe 8 into a liquid separator 9 wherefrom vapor is conducted through a pipe 10 into the superheater coils 4'. Liquid separated in the separator 9 is removed through a pipe 11 in which a valve 12 is inserted. The separated liquid may be returned to the operating medium upstream of the feed valve 7.

The operating medium which has been evaporated in the coils 4 is superheated in coils 4'. The coils 4' discharge into a header 13 to which a steam main 14 is connected, conducting the superheated vapor to a vapor consumer, for example a turbine plant, not shown.

One of the superheater coils, designated by numeral 15, is much shorter than the other superheating coils 4' and is short-circuited by a pipe 16 into the pipe 14. A body 17 is provided in the vessel 1 for filling the void caused by the shortened coil 15. The portion of the pipe 16 which otherwise would be exposed to the heat carrier fluid within the vessel 1 and the portion of the pipe 16 outside of the vessel 1 are provided with heat insulation 18. The body 17 also has a heat insulating effect on the pipe 16. The portion of the pipe 16 outside of the vessel 1 is provided with a temperature sensing device 20 which actuates a piston 22 through a spring 21. The piston 22 is movable in a cylinder 22' and controls a port 23 for admitting a pressure fluid into the cylinder 22' and a port 24 for releasing pressure fluid from the cylinder 22'. The latter is connected by means of a pipe 25 to the inside of the servomotor cylinder 6 which controls the feed valve 7.

When the plant is in normal operation, liquid operating medium is supplied through the valve 7 to the feed pipe 5 and therefrom through the evaporating coils 4 wherein the operating medium is evaporated. The water vapor is superheated in the superheater coils 4' and 15. As described before the latter is much shorter than coils 4' and discharges only slightly superheated vapor directly into the pipe 14. The temperature of the slightly superheated vapor is measured by the temperature sensing device 20 which actuates the valve 7 in the aforedescribed manner. The temperature to which the device 20 is responsive corresponds to the temperature of the vaporized operating medium at the end of the tube coil 15 which is connected to the pipe 16.

The intermediate point in the superheater where the temperature of the slightly superheated vapor is measured is close to the inlet of the superheater, but is at a location where the vapor generated in the generator is already in dry superheated state. This intermediate joint is preferably at 10% to 20% of the length of the coils 4' measured from the inlet of said coils. At this point the operating medium has reached about one third of its final superheat temperature. It is essential that the temperature sensing device measures the temperature of the vapor at a point where the vapor is dry during normal operation and does not contain liquid operating medium.

The body 17 fills the space which would be taken up by the coil 15 if this coil would have the same length as the coils 4'. The body 7 fills a gap through which the heat carrier fluid may be short-circuited and prevents that hot heat carrier fluid which is not yet cooled by the coils 4' contacts the coil 15. With the arrangement according to the invention the heat carrier fluid contacting the coil 15 has approximately the same temperature as the heat carrier which comes in contact with corresponding portions of the coils 4'. The arrangement assures that the temperature at the outlet of the coil 15 and at the beginning of the pipe 16 is substantially like the temperature of the operating medium in the parts of the coils 4' corresponding to the coils 15. The heat insulation 18 of the pipe 16 within and without the vessel 1 prevents undesired absorption and dissipation of heat by the pipe 16. Although the temperature sensing device 20 is outside of the vessel 1, it accurately measures the temperature of the vapor leaving the first portion of the superheater coils.

The temperature sensing device 20 responds continuously to the temperature of the pipe 16 by responding to heat expansion of said pipe. An increase of the temperature or length of the pipe 16 causes clockwise swinging of a lever which compresses through a connecting rod the spring 21 and moves the piston 22 to the right as seen in FIG. 1. This causes introduction of pressure fluid into the pipe 25 and into the cylinder 6. This effects lifting of a piston in the cylinder 6 against the action of a spring and opening of the valve 7 connected to the piston. Increased supply of liquid operating medium through the vapor generator causes a decrease of the temperature of the superheated vapor leaving the vapor generator. If the temperature of the vapor leaving the generator decreases, the aforedescribed parts of the control apparatus operate in the opposite direction, causing a reduction of supply of operating medium to the generator and restoration of the desired vapor temperature.

The control elements shown in FIG. 1 form a regulator having a proportional characteristic. A regulator having a proportional-integral characteristic or even a regulator having a proportional-integral-differential characteristic may be used without departing from the scope of the invention.

Figure 2:
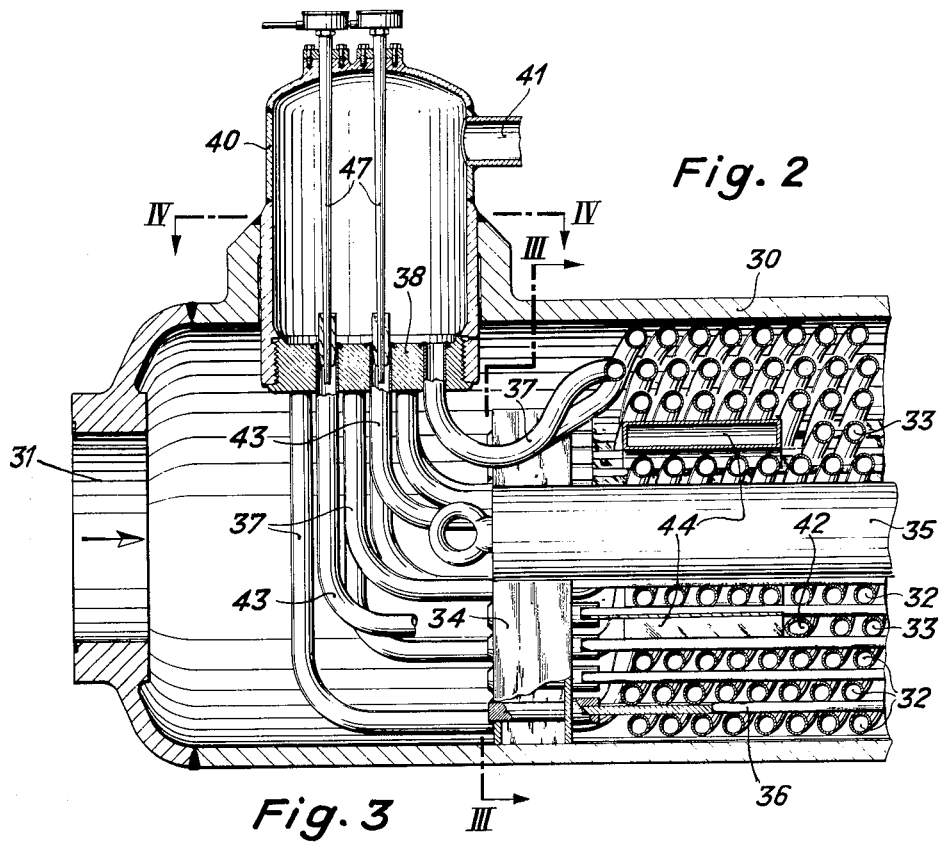
FIG. 2 is a diagrammatic illustration of a modified structure of the outlet and of a vapor generator controlled according to the invention.
Figure 3:
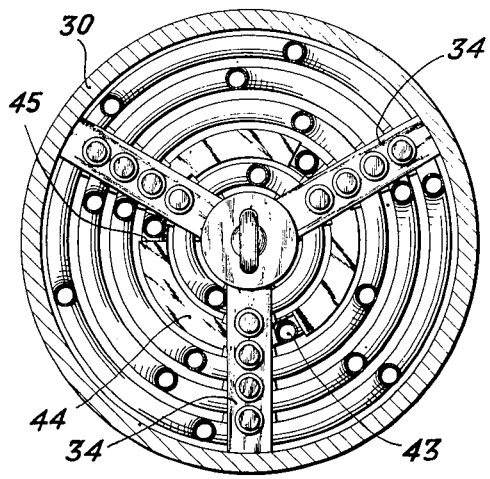
FIG. 3 is a cross-sectional view along line III—III of the structure shown in FIG. 2.
Figure 4:
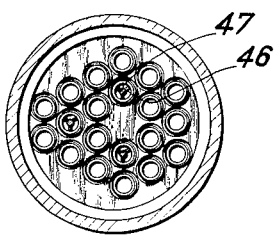
FIG. 4 is a cross-sectional view along line IV—IV of the structure shown in FIG. 2.

FIG. 2 shows the vapor discharge end and a portion of the superheater of a modified vapor generator. A heat carrier medium discharged by a nuclear reactor wherein the medium acted as a coolant is supplied into a vessel 30 through an inlet 31. The vessel 30 contains full-length pipe coils 32 and part-length pipe coils 33. The coils 32 and 33 are supported in the vessel 30 by support means including radial support arms 34, a central body 35 and spacer rods 36. The latter are connected to the support arms 34 and maintain a predetermined clearance between the coils 32 and 33. The outlet ends of the coils 32 are connected by connecting tubes 37 to a tube sheet 38 forming the bottom of a vapor dome 40. The vapor is removed from the dome 40 through a pipe 41. The ends 42 of the relatively short coils 33 are connected by means of tubes 43 to the tube sheet 38. The tubes 43 form the shortest possible connection between the ends 42 of the coils 33 and the tube sheet 38. Since there are no coils at the left side of the coils 33 there is a space or void which is filled by a hollow annular displacing element 44. The element 44 has three axial recesses 45 affording axial passage of the tubes 43. Thermocouples 47 are arranged in the outlets of the tubes 43 for measuring the temperature of the superheated vapor leaving the tubes 43. The thermocouples electrically actuate in the conventional manner, the feed valve 7 controlling the supply of liquid operating medium to the coils 32 and 33. As seen in FIG. 4 the thermocouples 47 are held in the center of the outlet of the tubes 43 by radial ribs 46. In the modification shown in FIG. 2 the pipes 43 are not insulated because in the construction shown in FIG. 2 there is little heat acting on these pipes. The pipes 43, however, may be insulated, if desired.

Figure 5:
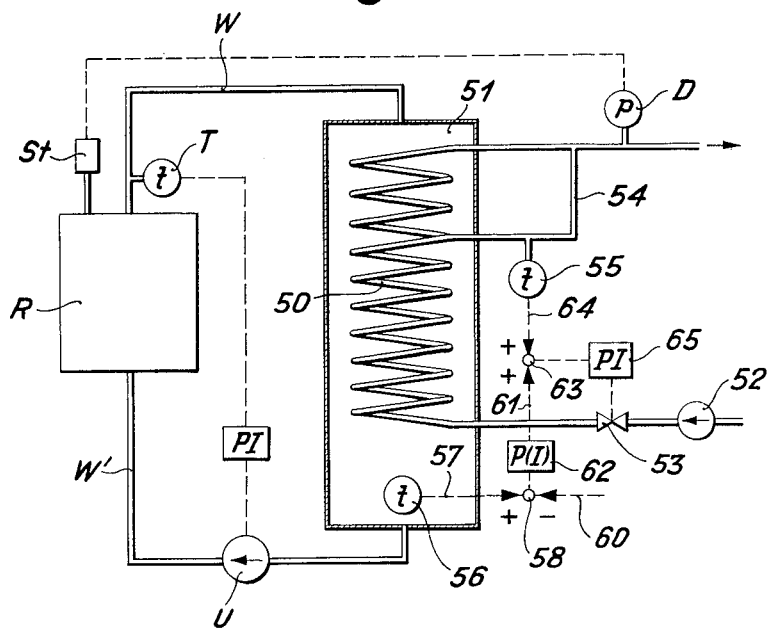
FIG. 5 is a diagrammatic illustration of a modified regulating system according to the invention.

FIG. 5 diagrammatically illustrates a control arrangement which is different from that shown in FIG. 1. One or a plurality of vapor generating coils 50 are placed within a vessel 51 through which a heat carrier fluid is conducted in counterflow relation to the operating medium flowing through the coils 50. Operating medium is pumped into the coil 50 by a feed pump 52 through a feed valve 53. As in the modification shown in FIG. 1 a portion of the vaporized operating medium is diverted from the coil 50 through a pipe 54, before the vapor has reached the final superheat temperature. The pipe 54 is provided with a temperature sensing device 55 which responds to a temperature corresponding to the temperature of the vapor at the point of connection of the pipe 54 to the coil 50. A second temperature sensing device 56 is provided which senses the temperature of the heat carrier fluid leaving the vapor generator. The signal produced by the device 56 is conducted through a conduit 57 to a comparison device 58 where the signal produced by the device 56 is compared with a set point signal arriving through a conduit 60. The resulting signal is conducted through a conduit 61 to a regulator 62 which produces a signal which is transmitted to an adding device 63 where the signal is combined with a signal arriving through a conduit 64 and corresponding to the temperature measured by the device 55. The resulting combined signal is transmitted from the adding device 63 to a regulator 65 which controls the actuation of the feed valve 53.

The heat carrier fluid flows through a reactor R and therefrom through a pipe W to the vapor generator vessel 51 and is returned to the reactor through a pipe W' in which a circulating pump U is inserted. A temperature sensitive device T is connected to the pipe W at the outlet of the reactor. This temperature sensitive device produces a control signal which controls the operation of the circulating pump U. The apparatus is so arranged that a rising temperature of the heat carrier fluid leaving the reactor causes an increase of the speed of the circulating pump U and conversely so that a predetermined outlet temperature of the heat carrier fluid is maintained. The heat output of the reactor is controlled in the conventional manner by control rods which are actuated by a conventional mechanism St. This mechanism may be operated in response to the pressure of the vapor produced in and leaving the vapor generator; the pressure is measured by a pressure sensitive device D.

In the arrangement shown in FIG. 5 the rate of supply of liquid operating medium to the vapor generator is additionally controlled in response to the temperature of the heat carrier fluid leaving the vapor generator. If, as shown, the regulator 65 has a proportional-integral character and the regulator 62 has only a proportional character, the temperature of the vapor diverted from the coil 50 and measured at 55 is maintained substantially constant and the signal produced by the temperature sensitive device 56 is used for correcting only. If both regulators 65 and 62 have only a proportional character, the rate of supply of operating fluid to the coil or coils 50 is controlled in response to an average value of the two temperatures whereby the influence of equal temperature deviations at 55 and 56 may be different. If the regulator 62 has a proportional-integral character and the regulator 65 has only a proportional character, the temperature at 56 will be maintained constant and the temperature at 55 is used for correcting only. In this case, in a plant according to FIG. 5, not only the temperature of the heat carrier fluid entering the vapor generator which corresponds to the temperature of the heat carrier fluid leaving the reactor is maintained constant, but also the temperature of the heat carrier fluid leaving the vapor generator and entering the reactor is maintained constant. In contradistinction to the arrangement shown in FIG. 5, the arrangements shown in FIGS. 1 and 2 permit variations of the temperature of the heat carrier fluid at the inlet and at the outlet of the vapor generator.

I claim:

1. A vapor producing plant operating under variable vapor output conditions, comprising:
   a nuclear reactor,
   a vapor generator,
   a heat carrier fluid,
   means for conducting said heat carrier fluid as a coolant through said nuclear reactor and as a heating agent through said vapor generator,
   said vapor generator comprising tubular heat exchange means conducting an operating medium through said vapor generator in counterflow relation to said heat carrier fluid,
   said heat exchange means comprising an evaporator wherein the operating medium is evaporated and a superheater for superheating the evaporated operating medium,
   said superheater having an inlet, an outlet, and an intermediate portion therebetween,
   a temperature sensing means connected to said superheater for sensing the temperature of said intermediate portion of said superheater, and
   means for controlling the rate of supply of liquid operating medium to said vapor generator,
   said control means being operatively connected to said temperature sensing means for increasing the rate of supply of liquid operating medium at increasing temperature of said intermediate portion of said superheater, and conversely.

2. A vapor producing plant as defined in claim 1 wherein a portion of the operating medium flowing through said intermediate portion of said superheater is diverted therefrom, and a conduit means is provided for conducting the diverted operating medium outside of said heat carrier fluid and of said vapor generator, and said temperature sensing means is connected to said conduit means outside of said vapor generator.

3. A vapor producing plant according to claim 2 including heat insulation for said conduit means for conducting the diverted operating medium.

4. A vapor producing plant operating at variable vapor output, comprising:
   a nuclear reactor,
   a vapor generator,
   a heat carrier fluid,
   an operating fluid,
   means for conducting said heat carrier fluid as a coolant through said nuclear reactor and as a heating agent through said vapor generator,
   said vapor generator comprising tubular heat exchange means conducting said operating fluid through said vapor generator in counterflow relation to said heat carrier fluid,
   said heat exchange means comprising a plurality of tube coils arranged in parallel relation with respect to the flow of said operating fluid therethrough and forming a superheater for the vapor generated in said vapor generator,
   each of said tube coils having a portion through which said operating fluid flows first,
   at least one of said tube coils being shorter than the other of said tube coils and being coextensive with said first portions of the other of said tube coils, said shorter tube coil leaving a void between the other of said tube coils,
   a filler body filling said void,
   a pipe connected to said shorter tube coil and extending outside of said vapor generator,
   a temperature sensing means connected to said pipe, and
   means for controlling the rate of supply of liquid operating fluid to said tubular heat exchange means,
   said control means being operatively connected to said temperature sensing means for increasing the rate of supply of liquid operating fluid at increasing temperature of said pipe, and conversely.

5. A vapor producing plant operating at variable vapor output, comprising:
   a nuclear reactor,
   a vapor generator including a vessel,
   a heat carrier fluid,
   an operating fluid,
   means for conducting said heat carrier fluid as a coolant through said nuclear reactor and as a heating agent through said vessel,
   said vapor generator including tubular heat exchange means placed in said vessel and conducting said operating fluid in counterflow relation to said heat carrier fluid,
   said heat exchange means comprising a plurality of tube coils arranged in parallel relation with respect to the flow of the operating fluid therethrough and forming a superheater for the vapor generated in said vapor generator,
   each of said tube coils having a portion through which operating fluid flows first,
   at least one of said tube coils being shorter than the balance of said tube coils and being coextensive with said first portions of the balance of said tube coils,
   a pipe connected to said shorter tube coil,
   said vessel having an opening,
   a tube sheet in said opening,
   said tube coils and said pipe terminating in said tube sheet,
   a temperature sensing device placed in said pipe at said tube sheet, and
   means for controlling the rate of supply of liquid operating fluid to said tubular heat exchange means,
   said control means being operatively connected to said temperature sensing means for increasing the rate of supply of liquid operating fluid at increasing temperature in said pipe, and conversely.

6. A method of controlling the rate of supply of a liquid operating medium to a vapor generator including an evaporator and a superheater for superheating the evaporater operating medium, the vapor generator being heated by a heat carrier fluid flowing in counterflow relation to the operating medium of the vapor generator and flowing as a coolant through a nuclear reactor, the method comprising the steps of:
   substantially maintaining a predetermined temperature of the heat carrier fluid leaving the nuclear reactor and entering the vapor generator,
   measuring the temperature of the operating medium of the vapor generator at an intermediate point of the superheater forming part of the vapor generator, before superheating is completed, forming a control signal corresponding to the aforesaid temperature of the operating medium, forming a control signal corresponding to the temperature of the heat carrier fluid leaving the vapor generator, combining said control signals to form a combined signal, and controlling the rate of supply of liquid operating medium to the vapor generator according to said combined signal.

References Cited by the Examiner

UNITED STATES PATENTS

| 2,193,863 | 3/1940 | Egloff | 60—107 |
| 2,989,453 | 6/1961 | Esscelman et al | 176—20 |
| 3,042,600 | 7/1962 | Brooks | 176—20 |

FOREIGN PATENTS 811,856  4/1959  Great Britain.

REUBEN EPSTEIN, *Primary Examiner.*